March 28, 1967
C. E. MAIDEN
3,311,462
METHOD OF SEALING GLASS TO METAL
Filed April 2, 1963
2 Sheets-Sheet 1
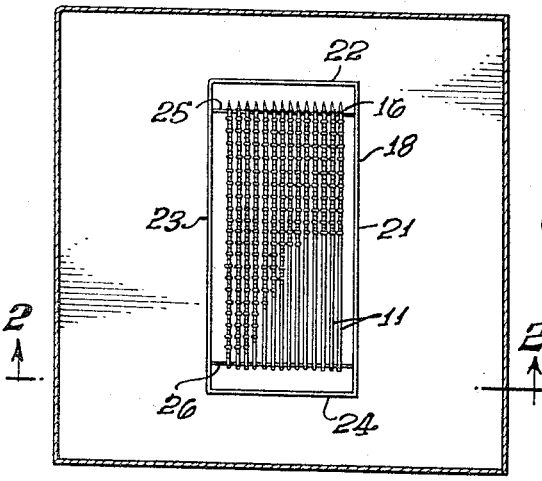
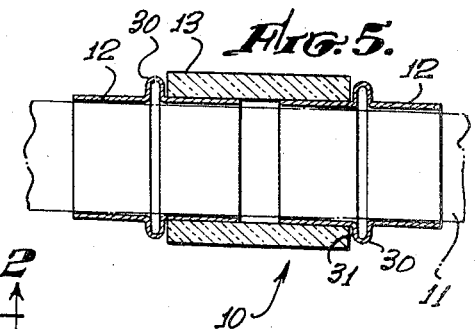
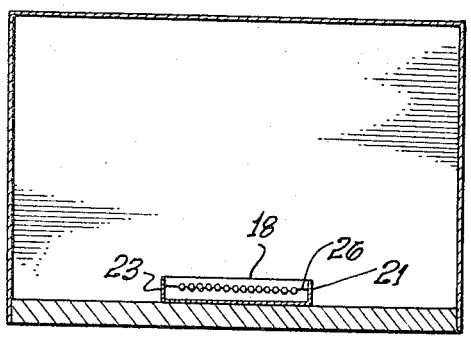
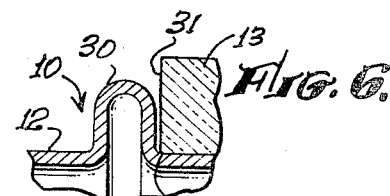
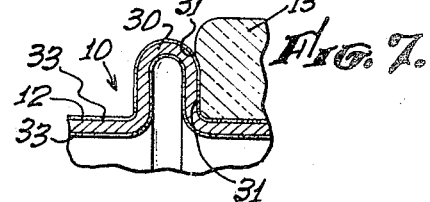
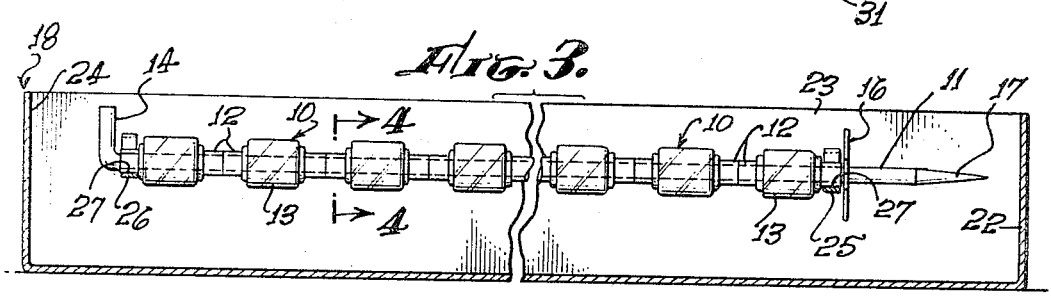
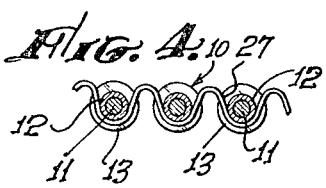
CLINTON E. MAIDEN,
INVENTOR.
BY Spensley and Horn
ATTORNEYS.

March 28, 1967　　　　　C. E. MAIDEN　　　　　3,311,462
METHOD OF SEALING GLASS TO METAL
Filed April 2, 1963　　　　　　　　　　　　　　2 Sheets-Sheet 2
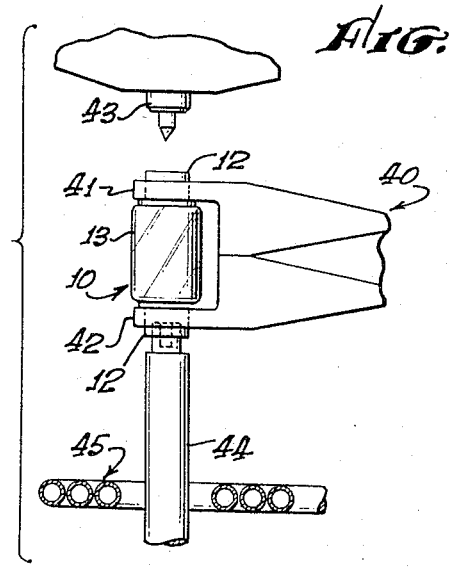
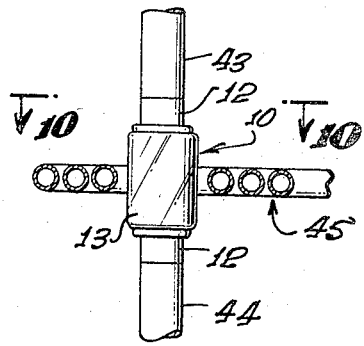
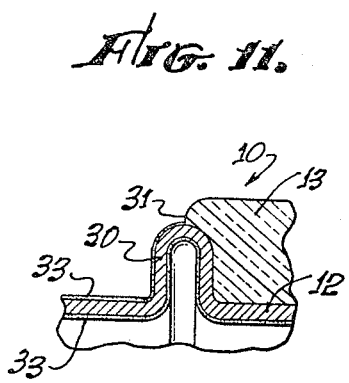
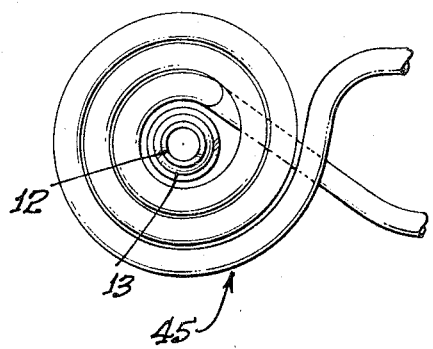
Clinton E. Maiden,
INVENTOR.
BY Spensley and Horn
ATTORNEYS.

United States Patent Office 3,311,462
Patented Mar. 28, 1967

3,311,462
METHOD OF SEALING GLASS TO METAL
Clinton E. Maiden, Canoga Park, Calif., assignor to TRW Semiconductors, Inc., Lawndale, Calif., a corporation of Delaware
Filed Apr. 2, 1963, Ser. No. 274,371
4 Claims. (Cl. 65—41)

This invention relates to a method of producing glass-to-metal seals and more particularly to a presealing technique employed prior to a subsequent sealing operation.

This application is a continuation-in-part of my copending patent application, Ser. No. 786,316, filed Jan. 12, 1959, now abandoned.

It has long been recognized in the semiconductor industry that the ideal package for housing a semiconductor electrical translating device includes a glass-to-metal seal to provide a truly hermetic seal. One such package is described and claimed in U.S. Patent No. 2,815,474, entitled, "Glass Sealed Semiconductor Rectifier," by William M. Lewis, Jr., and Henry D. Frazier, issued Dec. 3, 1957. This package includes a central glass cylinder to which are sealed a pair of metal sleeves or tubular shells at opposite ends thereof. The resulting assembly is called a fused body subassembly. Prior to the present invention, such fused body subassemblies were produced by assembling preoxidized Kovar shells to opposite ends of the glass cylinder and placing the loose assemblage on the mandrels of a fusion machine and heated by RF energy supplied to an RF coil surrounding the assemblage, with two shell-holding mandrels in position. One such machine performs holding and heating functions by positioning the shell-cylinder assemblage upon a vertically aligned first mandrel, after which the mandrel and the assemblage are automatically carried into an induction heating coil for fusion of the glass cylinder to the metal sleeves, a second upper mandrel in alignment with the first mandrel being brought down to bear against the uppermost part of the assemblage in order to hold it in a coaxial and aligned position during the heating and cooling cycle. After heating by the coil, cooling occurs by heat transfer from heated parts through the mandrels acting as a heat sink.

Heretofore, the yield, that is the percentage of properly fused subassemblies of those processed, has been relatively low, i.e., of the order of 45%. The low yield results from inconsistency of fusion from one body to the next. The principal cause of inconsistent fusion is the variation in fit between the I.D. of the glass cylinder and the O.D. of the mating metal shell. If the fit between the cylinder and the shell is fairly good, i.e., does not exceed a predetermined maximum and is fairly uniform, a good seal will be produced. If, on the other hand, the free space between the glass cylinder and the shells is greater than the predetermined amount, or is not substantially uniform, the body will be underfused at least over a part thereof. If the RF power is raised to compensate for the loose fits, then there will result shorter bodies from the "good" fits. This latter phenomena is due to the fact that the resistance of the heat path will be lessened. In the RF body fusion method herein referred to, there are two important paths of heat conduction away from the shell, which shell is the source of the heat when the power is on. One path leads to the glass cylinder while the other path leads to the mandrels. Assuming a constant fit between the mandrels and the shell, the heat transmission of this path may be assumed to be constant. Thus, a tight cylinder-shell fit will effectively lower the resistance of the glass-cylinder path, causing more heat to flow to the glass. Because of this greater heat transmission to the glass, the glass may overheat, causing the entire glass cylinder to melt, resulting in a short body, i.e., one whose overall length will be less than the predetermined minimum specification length. Contrariwise, a loose cylinder-shell fit will effectively raise the resistance of the glass cylinder path, causing more heat to flow to the mandrels. Because of this lower heat transmission, the glass may fail to heat sufficiently to melt it completely where it is to be sealed to the metal shells, resulting in a poor seal. Thus, it is important that a constant cylinder-shell fit be maintained during the RF fusion step.

It has further been found that a loading delay, that is a delay in placing the next body assemblage in position, results in much the same difficulty. A loading delay permits the mandrels to cool more than usual, causing the heat to flow over this path faster than usual, thus robbing the glass of sufficient heat so that formation of a good seal becomes unlikely. Thus, if the RF power is set to produce a high percentage of parts with good seals there will be an inordinate number of short bodies produced. Due to the above and other difficulties, the yield of properly fused, proper length bodies seldom exceeded 45%.

The present invention has as its primary goal to provide a method for increasing the quality of the seal of the character described resulting in fused body subassemblies of consistent dimensions and of improved aesthetic appearance.

Yet another object of the present invention is to provide a method for minimizing the effects of loose and tight fits between the glass cylinder and metal shells as it relates to producing a properly fused body.

A further object of the present invention is to provide a method which increases the yield of good seals while permitting a control over the length of the body to a closer tolerance than has heretofore been achieved.

Yet a further object of the present invention is to provide a method which increases the productivity of the RF fusion sealer of the general character described.

In accordance with the present invention technique, the creation of a fused body subassembly consists of two separate process steps. The first step is to assemble the glass cylinder and metal shells in the desired relationship and while so maintaining them, under no axial load, heating the assemblage under peredetermined conditions of temperature and time to soften the glass only sufficiently to achieve intimate contact with the metal shells, followed by controlled cooling to anneal the glass as it shrinks onto the metal shells. An incomplete glass-to-metal seal is created in the first process step, yet the parts are united in the desired relationship with sufficient strength to enable subsequent deferred handling without disruption and insures maintenance of proper alignment during subsequent creation of a true hermetic seal. The incomplete glass-to-metal seal resulting from this first process step may be termed a "black seal."

The present invention second step consists of heating the black-sealed assemblage through a predetermined short heating cycle to a high temperature to fuse the glass cylinder to the metal shells and form a true hermetic seal, thereby completing the fused body subassembly.

It is presently preferred to perform the present invention first step by stringing a plurality of assemblages upon a wire, the assemblages being disposed in end-to-end coaxial alignment on the wire without an axial load, the wire merely acting as a mandrel to keep the assemblages aligned. A plurality of assemblage-strung wires are then placed in a suitable boat, such as thin gauge nickel, and heated and annealed to form the black seal. It is presently preferred to perform the present invention second step in an RF fusion machine of the general type discussed hereinabove. There is no necessity for performing the two process steps in a closely spaced time relationship, the black sealed assemblages resulting from performance of the first process step typically being unloaded into a container for transportation or bin storage.

The novel features which are believed to be characteristic of the invention, both as to its organization and method of operation, together with further objects and advantages thereof will be better understood from the following description considered in connection with the accompanying drawings in which an embodiment of the method of the present invention is illustrated by way of example. It is to be expressly understood, however, that the drawings are for the purpose of illustration and example only, and are not intended as a definition of the limits of the invention.

In the drawings:

FIGURE 1 is a plan view showing a plurality of body assemblages strung on a number of wires which are disposed in a boat within an oven in accordance with the method of the present invention;

FIGURE 2 is a sectional side view taken along the line 2—2 of FIGURE 1;

FIGURE 3 is an enlarged view showing one of the wires of FIGURE 1 carrying the body assemblages;

FIGURE 4 is a view taken along the line 4—4 of FIGURE 3;

FIGURE 5 is an enlarged view showing one body assemblage on the wire of FIGURE 3 before being heated within the oven of FIGURES 1 and 2;

FIGURE 6 is a greatly enlarged view of the assemblage of FIGURE 5 in the vicinity of the seal between the glass cylinder and a metal shell showing how they appear prior to being heated within the oven of FIGURES 1 and 2;

FIGURE 7 is a view similar to that of FIGURE 6 showing how the parts appear after being heated in the oven of FIGURES 1 and 2;

FIGURE 8 is a front elevation showing a black-sealed assemblage which has been formed in accordance with the first method step of the present invention as it is being loaded in an RF fusion sealing machine;

FIGURE 9 is a view of the assemblage and machine of FIGURE 8 with the assemblage in position during the fusion cycle;

FIGURE 10 is a view taken along the line 10—10 of FIGURE 9; and

FIGURE 11 is a view similar to that of FIGURE 7 showing how the parts appear after being heated by the coil of FIGURES 8, 9 and 10.

The present invention two-step process will now be described with reference to the drawings, in which are illustrated various exemplary apparatus for performance of the process. Turning first to FIGURE 5, there is shown an assemblage 10 from which the desired fused body subassembly will be created. The assemblage 10 consists of two opposed tubular metal sleeves 12 which are inserted within opposite ends of a tubular glass cylinder 13. For purposes of clarity and simplicity only, the method of the present invention will be described with reference to a subassembly in which the metal sleeves or shells 12 are made of Kovar (an alloy comprising 29% nickel, 17% cobalt and the balance iron) and the central glass cylinder is a hard borosilicate glass which has a softening point of approximately 708° C. One such glass consists of 80% silicon, 14% boric oxide, 4% soda and 2% alumina. It will be understood, however, that the method of the present invention is equally applicable to producing glass-to-metal seals of different glasses or metals than those specifically designated herein without departing from the spirit of the invention, appropriate changes being made in the temperature-time cycle as hereinafter described.

A plurality of assemblages 10 are strung onto wires 11 in preparation for the present invention first process step. As shown in FIGURE 1, a plurality of wires 11, each strung with a series of assemblages 10, are disposed in a boat 18. The wires 11 should be of a material which maintains its strength at the elevated temperatures herein referred to while remaining chemically inert, and which further is a good thermal conductor. Nickel-chromium alloy wire has been found to be particularly satisfactory for this purpose. One such alloy consists of 80% nickel and 20% chromium. Another alloy which has been found to be suitable for the purposes stated consists of the following: 9% iron, 15% chromium, and approximately 70% nickel with traces of other constituents such as carbon, manganese, copper and aluminum, among others.

The various component parts of the assemblages 10 are strung upon the wires 11 in the manner as shown in FIGURE 3. At one end of each of the wires 11 there is a substantially 90° bend at 14 in order to act as a stop. Thereafter, a shell 12, a glass cylinder 13, two shells 12, another glass cylinder, etc., are placed upon the wire 11. The operator in loading the wire should take care to see that all of the parts fit together essentially as shown in FIGURE 3. Thereafter, a hairpin-like retainer clip 16 is placed around the wire 11 to hold the assemblies together. It will be noted in FIGURE 3 that the end of the wire at 17 opposite the bend at 14 is generally cone-shaped in order to facilitate loading of the body assemblies upon the wire 11.

The boat 18 is shown to be generally rectangular in shape and includes vertical side walls 21, 22, 23 and 24 to support cross members 25 and 26. The cross members 25 and 26 each define a plurality of depressions 27 to receive the loaded wires 11, as may best be seen in FIGURE 4. The depressions 27 on both members 25 and 26 are aligned with each other to retain all of the loaded wires spaced substantially parallel and equidistant from each other.

The boat material must be capable of maintaining its strength at the oven temperature while remaining inert relative to the Kovar shells while also being a good thermal conductor. A material which has been found to be most satisfactory is nickel.

It is necessary that the wires 11 be spaced uniformly and possess good thermal conductivity as must the boat material in order that no thermal gradients exist in the oven. This will insure that all of the subassemblies will be heated to the same temperature within the oven during the heating cycle.

FIGURE 6 shows a greatly enlarged view of a metal shell 12 in the vicinity of the bump 30 showing how the glass cylinder 13 fits with respect to the shell prior to the heat treatment in accordance with the present invention. It will be seen that the end 31 of the glass cylinder 13 slides over the sleeve 12 up to point 32 where the curvature of the bump 30 begins. With each of the bodies so assembled upon the wires 11, the wires are placed in position within the boat 18 as may be seen in FIGURES 1 and 2.

One or more boats may then be placed within an oven for subjection of the assemblages to a predetermined heating cycle in order to create the aforementioned black seal. To create the black seal the assemblages are quickly heated to a temperature above the softening point of the glass cylinders so that the glass will soften sufficiently to flow slightly and begin to mold onto the metal shells thereby effectively eliminating the I.D. tolerances of the glass. The assemblages must then be rapidly cooled to below the glass softening point to maintain the cylindrical shape of the glass, then slowly enough through the glass annealing temperature range to insure proper annealing.

The hereinabove-described glass used in the exemplary embodiment possesses the following temperature characteristics:

| | ° C. |
|---|---|
| Annealing point | 480 |
| Strain point | 435 |
| Upper mechanical working temperature | 420 |

Therefore the minimum annealing temperature range for this particular glass extends from 480° C. to 435° C.

The desired black seal can be produced in the exemplary embodiment by placing one or more loaded boats 18 in a furnace preheated to a temperature of about 850° C., the assemblages being allowed to remain in the furnace for about 80 to 90 seconds. During this period in the furnace the glass cylinders soften slightly and the glass flows to a certain extent and into more intimate contact with the metal shells to form a substantially perfect fit. After being in the furnace for about 80 to 90 seconds, the boats are quickly removed to prevent further flowing of the glass and distortion of the shape and dimensions of the glass cylinders.

Upon removal from the furnace the boats 18 are immediately placed within a covered box made of a thermal insulating material, such as asbestos, to slowly cool the assemblages through the glass annealing range. An insulating material which has been found satisfactory for this purpose is one manufactured under the trademark "Transite" by Johns-Manville Corp. When using a cooling box constructed of "Transite," the assemblages of the exemplary embodiment cool through the annealing range in about 15 minutes. Of course, other cooling methods and times could be suitably employed, proper annealing being the controlling factor. Thus, it is merely necessary to cool the glass slow enough so that residual stresses will be reduced to a tolerable level, this being dependent upon the size and shape of the parts involved and the degree of annealing required for subsequent handling and processing. Annealing is an important part of the present invention process since the resistance of the glass to mechanical and heat shock is increased, thereby enabling a closer control over dimensional tolerances during the final fusion step in a two-fold manner. First, the assemblages are maintained in the proper coaxial alignment and close fit during heating in an RF fusion machine, and second, the increased resistance to heat shock causes less distortion of the glass during the RF fusion cycle. An additional advantage derived from the increased resistance to mechanical shock is a better yield due to less likelihood of glass cracking during subsequent handling and processing.

Upon cooling to a temperature of about 400° C. the boats may be removed from the cooling box and allowed to cool at a faster rate to room temperature. Upon subjection to the above-described first process step that portion of each assemblage 10 in the vicinity of the bump 30 will appear as shown in FIGURE 7. A layer 33 of oxidized Kovar will have been produced over the entire surface of the shell 12. Furthermore, the glass will have run to the extent indicated and will be in more intimate contact with the shell, i.e., the glass will be in intimate contact with the shell over much of the side wall of the bump 30. The oxide layer 33 on the Kovar shells is black in color, hence the origin of the term "black seal." Actually the black seal so produced provides a fairly strong mechanical bond, but one which will not serve as an adequate hermetic seal. The bond strength is adequate to enable subsequent loose storage, handling and processing while still maintaining the subassembly configuration in substantially perfect alignment.

The second and final step in the present invention process is to heat the black sealed assemblages to fuse the glass cylinders to the metal shells in a true hermetic seal, this fusion heating step being performed quickly to prevent distortion of the glass and consequent deviation from the desired dimensional tolerances. It is presently preferred to conduct this second process step using an RF fusion sealing machine of the type described in copending U.S. patent application, Ser. No. 786,150, filed Jan. 12, 1959 by Henry D. Frazier and Pat W. Richey, and entitled, "Single Station Fusion Machine," and using automatic feeding apparatus of the type shown and described in copending U.S. patent application Ser. No. 189,460, filed Apr. 23, 1962 by Alexander Boyd, and entitled, "Automatic Feeder for Diode Body Fusion Machine," both of these copending applications being assigned to the present assignee. It is preefrred to use an RF fusion machine for performance of the present invention second step because of the characteristic rapidity of its heating cycle, slower heating cycles tending to distort the glass and so create problems of length and shape control. The RF heating cycle permits completion of the glass-to-metal seal at the higher "working" temperature during a short enough time interval to enable maintenance of the glass cylinder without significant distortion.

When manually feeding the black-sealed assemblages to the RF fusion machine, an assemblage 10 is placed upon the lower mandrel 44 by means of tongs 40 which grip the body by fingers 41 and 42 as may best be seen in FIGURE 8. The lower mandrel is spring loaded, causing it to extend up through RF coil 45 when no downward force is applied thereon. This feature lends to ease of loading. After the assemblage 10 is placed into position upon the lower mandrel 44, the upper mandrel 43 is brought down to make contact with the upper sleeve 12 of the assemblage 10, thus forcing the entire assemblage and the lower mandrel downward until the assemblage assumes the position relative to coil 45 as shown in FIGURE 9 and FIGURE 10. In FIGURES 9 and 10 the assemblage 10 is shown to be halfway through the coil 45 and is now ready to be heated for fusion of the glass cylinder to the metal shells in a "gray seal." The RF excitation of the coil causes the assemblage 10 to become heated. The glass softens and begins to run so that the end 31 begins to run up upon the bump 30 as may best be seen in FIGURE 11. The RF energy is then removed and the glass again hardens, this time forming a complete, strong mechanical and hermetic seal between the shells 12 and the glass cylinder 13. Upon cooling the Kovar shells assume a gray color, hence the process is referred to as "gray-sealing."

In order to make more clear the significance of the method of the present invention, the following dimensions of the glass cylinder and metal shells are given. The glass cylinder I.D. varies from 0.089" to 0.093" while the O.D. of the shells vary from 0.089" to 0.087". It is therefore clear that the fit between the shells and the cylinder may vary from 0 to 0.006". The above dimensions are those which are the best which are commercially achievable for the parts in accordance with the herein described body subassembly.

Prior to employing the "black seal" process in accordance with the present invention the length control on completed subassemblies varied from a minimum of 0.250" to 0.285". By employing the present invention presealing method prior to use of the RF fusion sealing machine, the length control now varies from a minimum of 0.270" to a maximum of 0.278". Thus, the length variation was reduced from 0.035" to 0.007", an improvement of 500%. This factor of length control not only improves the yield of properly fused, proper length bodies (the predetermined minimum length for the subassemblies should be 0.265", thus it is seen that all of the fused subassemblies now meet this standard) but it also increases the yield on subsequent operations in the production of a complete device. It further makes possible the use of automatic feeding apparatus of the type shown in the aforementioned copending application of Alexander Boyd, where before it had been impractical due to the large variations in length of the assemblages.

Another advantage gained from this process is that the yield increased from 45% to 90% while the given RF fusion sealing machine was able to increase its output from 2500 to 4000 parts per eight hour shift.

Additionally, the present invention process has improved the diameter control of the glass cylinder 13 from 0.009" to 0.006". Also, uniform shape of the glass cylinders without concavity or other undesirable deformation has been achieved permitting easier applications of colorcoding bond with even uniform color and width. All of these factors contribute to an overall improvement in the aesthetic appearance of the completed device.

There has thus been described a new and improved two-step process for hermetically sealing a glass part to a metal part, the first step being to preseal the parts in the desired relationship, after which the glass is annealed for stress relief, the second step being a fusion heating step to create a true hermetic seal. By performing the first process step, the parts are preassembled in the desired relationship and close fit without distortion, the annealing of the glass increasing resistance to mechanical and heat shock, thereby enabling attainment of a better yield and closer dimensional tolerances upon final hermetic sealing. Although the invention has been described with a certain degree of particularity, it is understood that the present disclosure has been made only by way of example and that numerous changes in the details of construction and the combination and arrangement of parts used in performance of the present method, as well as various modifications in the method steps, may be resorted to without departing from the spirit and the scope of the invention as hereinafter claimed. For example, although the assemblages are described as being black sealed in batches, it is possible to accomplish the same by continuous feeding on a line.

What is claimed is:

1. The method of forming a fused body subassembly comprising a glass tube and a metal sleeve hermetically sealed in coaxial relationship therewith comprising: assembling a glass tube and a metal sleeve in a desired adjacent coaxial relationship; heating said glass tube to soften the glass only sufficiently to achieve close contact between adjacent parts of said glass tube and metal sleeve without significant distortion of the shape and dimensions of said glass tube, while maintaining said glass tube and metal sleeve in said relationship in the absence of an applied compressive force, to thereby mechanically bond said glass tube and metal sleeve in said relationship; cooling said glass tube from below its softening point slowly enough to achieve annealing of the glass to thereby increase the resistance of the glass to mechanical and heat shock and enable subsequent deferred handling and closer control over dimensional tolerances during subsequent hermetic sealing; and, thereafter subjecting the thus mechanically bonded glass tube and metal sleeve to a heating cycle which is rapid enough to fuse the adjacent parts of said glass tube and metal sleeve in a complete hermetic seal without substantial distortion of said glass tube.

2. The method of forming a fused body subassembly comprising a glass tube and a metal sleeve hermetically sealed in coaxial relationship therewith comprising: assembling a glass tube and a metal sleeve in a desired adjacent coaxial relationship; heating said glass tube above its softening point for a time short enough to soften the glass only sufficiently to achieve close contact between adjacent parts of said glass tube and metal sleeve without significant distortion of the shape and dimensions of said glass tube, while maintaining said glass tube and metal sleeve in said relationship in the absence of an applied compressive force, and quickly cooling said glass tube below its softening point but above its annealing point to thereby mechanically bond said glass tube and metal sleeve in said relationship; cooling said glass tube below its annealing point slowly enough to achieve annealing of the glass to thereby increase the resistance of the glass to mechanical and heat shock and enable subsequent deferred handling and closer control over dimensional tolerances during subsequent hermetic sealing; and, thereafter subjecting the thus mechanically bonded glass tube and metal sleeve to a heating cycle which is rapid enough to fuse the adjacent parts of said glass tube and metal sleeve in a complete hermetic seal without substantial distortion of said glass tube.

3. The method of forming a fused body subassembly comprising a glass tube and a metal sleeve hermetically sealed in coaxial relationship therewith comprising: assembling a glass tube and a metal sleeve in a desired adjacent coaxial relationship; heating said glass tube above its softening point for a time short enough to soften the glass only sufficiently to achieve close contact between adjacent parts of said glass tube and metal sleeve without significant distortion of the shape and dimensions of said glass tube, while maintaining said glass tube and metal sleeve in said relationship in the absence of an applied compressive force, and quickly cooling said glass tube below its softening point but above its annealing point to thereby mechanically bond said glass tube and metal sleeve in said relationship; cooling said glass tube below its annealing point slowly enough to achieve annealing of the glass to thereby increase the resistance of the glass to mechanical and heat shock and enable subsequent deferred handling and closer control over dimensional tolerances during subsequent hermetic sealing; and, thereafter heating the thus mechanically bonded glass tube and metal sleeve by radio frequency energy to fuse the adjacent parts of said glass tube and metal sleeve in a complete hermetic seal without substantial distortion of said glass tube.

4. The method of forming a fused body subassembly comprising a glass tube and a metal sleeve hermetically sealed in coaxial relationship therewith comprising: assembling a glass tube and a metal sleeve in a desired adjacent coaxial relationship; heating said glass tube above its softening point for a time short enough to soften the glass only sufficiently to achieve close contact between adjacent parts of said glass tube and metal sleeve without significant distortion of the shape and dimensions of said glass tube, while maintaining said glass tube and metal sleeve in said relationship in the absence of an applied compressive force, and then quickly cooling said glass tube to below its softening point but above its annealing point to thereby mechanically bond said glass tube and metal sleeve in said relationship for subsequent deferred handling; cooling said glass tube through and below its annealing point slowly enough to achieve annealing of the glass to thereby increase the resistance of the glass to mechanical and heat shock to thereby insure maintenance of said relationship during subsequent deferred handling and closer control over dimensional tolerances during subsequent hermetic sealing; and, thereafter subjecting the thus mechanically bonded glass tube and metal sleeve to a heating cycle which is rapid enough to fuse the adjacent parts of said glass tube and metal sleeve in a complete hermetic seal without substantial distortion of said glass tube while maintaining said glass tube and metal sleeve in said relationship.

References Cited by the Examiner
UNITED STATES PATENTS

| | | | |
|---|---|---|---|
| 2,386,820 | 10/1945 | Spencer | 65—32 |
| 2,549,504 | 4/1951 | Messanna | 65—38 |
| 2,697,309 | 12/1954 | Gates | 65—59 |
| 2,775,676 | 12/1956 | Granberry et al. | 65—154 X |

DONALL H. SYLVESTER, *Primary Examiner.*

D. CRUPAIN, A. D. KELLOGG, *Assistant Examiners.*